Aug. 5, 1952 R. M. HEINTZ 2,606,221
COMMUTATOR STRUCTURE
Filed April 28, 1951

INVENTOR.
Ralph M. Heintz
BY Lippincott & Smith
ATTORNEYS

Patented Aug. 5, 1952

2,606,221

UNITED STATES PATENT OFFICE 2,606,221

COMMUTATOR STRUCTURE

Ralph M. Heintz, Los Gatos, Calif., assignor to Jack & Heintz Precision Industries, Inc., Cleveland, Ohio, a corporation of Delaware Application April 28, 1951, Serial No. 223,625

6 Claims. (Cl. 171—321)

This invention relates to a type of commutator structure which is of general utility in direct-current dynamo electric machinery but is especially adapted for use in high-speed heavy-duty machines for use in aircraft or other situations where cooling is particularly difficult and commutators of ordinary construction are subject to rapid deterioration.

Ever since the first advent of dynamo electric machinery the commutator has been the most vulnerable part of the device. It is a composite structure, formed of a large number of parts all of which must be mutually insulated, electrically. In use, large amounts of heat are evolved at its surface owing to the brush friction, the brush contact resistance, and, frequently, arcing, particularly if the brush adjustment is at all inaccurate. The facilities for getting rid of the heat thus evolved are poor; ordinarily the commutator is mounted on a steel shaft and insulated therefrom by fiber or "Micanite" the thermal conductivity of which is poor. For mechanical reasons the insulation between the commutator bars or segments must have a material thickness. Copper is practically universally used for the commutator bars themselves. This material has a relatively high coefficient of expansion in comparison with the coefficient of the steel shaft and therefore in every cycle of use and disuse a differential expansion occurs which causes a "working" at the points of contact. This inevitably tends to loosen the structure and make the already poor thermal bond between the parts even worse. Furthermore, if the commutator pits or if any bridging occurs between adjacent bars so that an unequal evolution of heat takes place, considered around the commutator, differential expansion occurs as between the bars themselves which further aggravates the situation.

Various structures have been devised to minimize these difficulties. In perhaps the most generally used structure a dovetail is formed on the inner edge of each commutator segment and each layer of insulation. These dovetails are engaged by inner and outer wedge rings, forced together by pressure applied to the end of the structure, as, for example, by a nut threaded onto the shaft. This arrangement prevents any material longitudinal movement as between the commutator and shaft; when differential expansion occurs the commutator bars can only bow outwardly, which further reduces the thermal bond with the shaft. When this happens repeatedly there is a tendency for the mica insulation to work out from between the segments. The bowing also causes non-uniform wear of the commutator surface under the brushes which impairs the brush contact, causing still further heating.

Other methods of construction permit longitudinal expansion of the bars so that no such bowing as has been mentioned occurs, but this may cause the entire commutator structure to creep along the shaft, with other attendant difficulties.

It will be apparent that the greater the current which must be handled by the commutator the more apparent are the shortcomings which have been mentioned. In small, low-power machines the size of the commutator is dictated by purely mechanical considerations. In larger machines the question becomes one of how much heat can be dissipated and the size of the commutator is dictated by this factor.

It is in machines for use in aircraft at high altitudes that the problems mentioned become most serious. For such applications the weight of the machine as a whole must be kept as low as possible, recourse is therefore had to high-speed machines, turning several thousand R. P. M. since this gives a high power-to-weight ratio. At high altitudes, however, the cooling ability of an air blast becomes very low because of the reduced density in the air. The frictional heat developed at the commutator also rises, due to the high speeds involved, and, in the limit, the commutator may easily become a major factor in the weight of the machine as a whole.

The broad purpose of this invention is to minimize the difficulties above discussed. Specifically, among the objects of this invention are to provide a commutator structure wherein the heat evolved may be rapidly withdrawn and dissipated; to provide a commutator structure having minimal internal thermal resistance so that the temperature between the various portions thereof is rapidly equalized; to provide a structure wherein the major heat flow is inward and reliance need not be placed on radiation and convection from the active commutating surface; to provide a commutator structure wherein the coefficients of expansion of the diverse metals entering into it are so chosen that the entire device is thermally stable and a minimum of differential expansion or working occurs as between the various parts; to provide a structure wherein the necessary insulation can be provided by relatively large areas of extremely thin natural mica in place of smaller sheets of thicker reconstructed mica of lower thermal conductivity, and, in general, to provide a structure which may be easily, quickly and accurately assembled.

The conventional commutators with which I am acquainted comprise segmental bars fitted together like the stones of an arch and separated only by the layers of insulation between the bars, the contact with the central structure or shaft being merely the thin edges of the commutator segments. In contradistinction to these conventional commutators, that of my invention comprises, broadly a central support ring, in the outer periphery of which there are formed a plurality of uniform, substantially contiguous V-shaped grooves, the angles subtended at the apices of these grooves being materially greater than that subtended at the periphery of the commutator at the open ends of the V's; i. e., the septa between the grooves come to nearly sharp edges at the periphery of the support ring. Commutator sectors, having an angle conforming to that of the grooves, are fitted therein and insulated from the support ring by thin sheets of insulating material, preferably natural mica. The commutator segments are held in place by retaining rings, also insulated from the segments by thin sheet material and fitted in place by a shrink fit. Preferably the support ring is formed integrally with a hollow shaft of the device as a whole; preferably, also, the coefficients of expansion of the metallic elements recited are so chosen that the successive coefficients increase slightly, considered outwardly from the support ring, to the commutator segments, and the retaining rings. With this arrangement a coolant can be circulated within the hollow shaft of the device and, the heat flow being inward, a somewhat greater coefficient of expansion of the shaft is compensated by its lower temperature so that the differential expansion as between the parts is relatively small. The coefficient of the retaining rings is least important; they should be made of material of higher tensile strength than the remainder of the structure so that they may be stretched within their elastic limit by the maximum expansion that takes place; their coefficient of expansion should not exceed the mean of the structure of the whole but below this limit there may be a considerable latitude.

The drawings show the details of a specific embodiment of my invention as embodied in a dynamo electric machine specifically designed for aircraft use. In these drawings.

Figure 3:
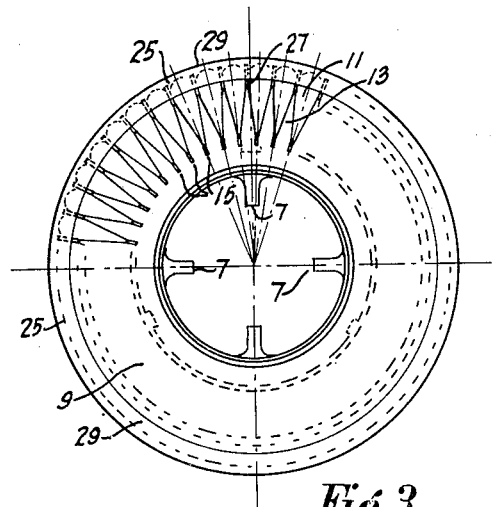
Fig. 3 is an end view of the commutator and its support ring as illustrated in Fig. 1.

In the figures the reference character 1 designates a hollow armature shaft; the outside diameter of the major portion of this shaft is, in the example shown, approximately 2.4″ while the inside diameter of the major portion is 1 18/″. External threads 3 are formed on one end of the shaft and internal threads 5 on the other, to permit attachment of bearing and other auxiliary structures which, since they do not form a portion of this invention, are not shown. Projecting inwardly into the passage within the shaft are a plurality of vanes 7, forming a portion of a pump structure for circulating liquid within the shaft: the remaining portion of the pump structure is also omitted as being foreign to this invention, it being sufficient to point out that the shaft is hollow so that a cooling fluid may be circulated therein.

Formed integrally with the shaft, at the right hand end as shown in the drawing, is a support ring 9 with an enlarged diameter as compared with that of the shaft itself; in the particular device shown the support ring has an outer diameter of 3 5/8″. It should be understood that all dimensions here given are illustrative only and are not to be taken as limiting but merely to indicate what I consider to be good practice and to enable the reader to evaluate the scale of the drawings. In the periphery of the support ring 9 are a plurality of uniform, substantially contiguous V-shaped grooves 11. As shown in Fig. 3 the angles at the apices of these grooves are larger than the angle subtended by the commutator bars (plus insulation) at the periphery of the commutator. Thus in the device illustrated, forty-five commutator bars are employed, each thus subtending an angle of 8°. As shown in Fig. 3, however, the angles at the apices of the grooves are each of 22°, so that the septa or partitions 13 between the grooves come to a nearly sharp edge. It is not necessary, or even desirable, that the septa terminate in knife edges since these would be subject to damage in construction; in the specific case illustrated the sides of the grooves are separated by about 0.02″. It is also preferable, although not necessary, that a narrow parallel-sided slot 15 be formed at the bottom of each groove.

Figure 4:
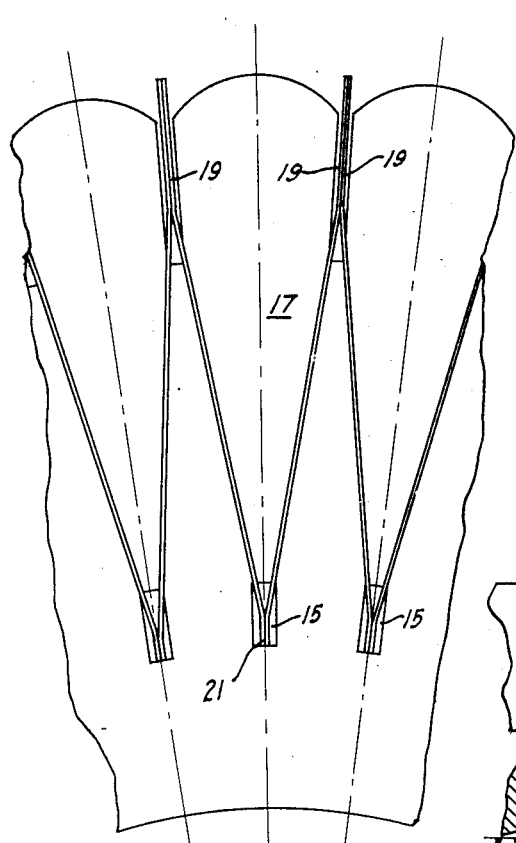
Fig. 4 is a fragmentary end view, also on a larger scale, of a portion of the support ring with one segment and its insulation in place.
Figure 2:
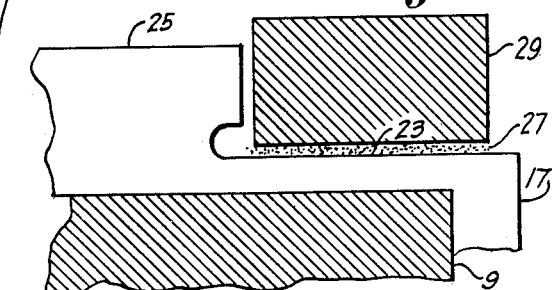
Fig. 2 is a fragmentary view, on a larger scale, showing the end of one of the commutator bars as assembled in position.
Figure 1:
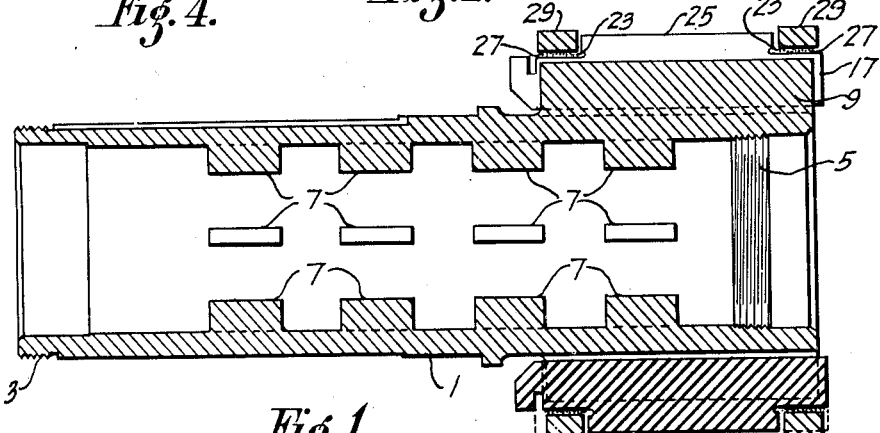
Fig. 1 is a longitudinal sectional view of a commutator embodying this invention and the shaft of the machine of which the commutator forms a part.

Commutator bars or segments 17 are fitted into the grooves and insulated therefrom by flat sheets 19 of insulating material, in the present instance, natural mica, 0.005″ thick. The edges of these sheets are fitted down into the slots 15 as shown at the reference character 21 in Fig. 4. The angles of the commutator bars conform to the angles of the grooves i. e., in this case 22°—for a width approximately equal to the depth of the grooves. The bars project from some distance beyond the grooves. Where they project beyond the grooves the taper of the bars may be decreased to substantially the angles subtended by the bars themselves, i. e., in this case 8°.

A shoulder 23 is formed on each end of the commutator bars slightly above the outer surface of the supporting ring 9, the actual contacting surface 25 of the commutator projecting beyond this shoulder. The bars are first tightly wedged into the grooves 11, a ring 27 of thin insulation, preferably natural mica of about the same thickness used for the commutator insulation 19, is put in place around the commutator shoulders, and the retaining rings 29 are shrink-fitted over the mica insulating rings 27. In performing this operation the thin mica may be cemented in place, as, for example, with a thermosetting cement such as one of the phenolic resins, which holds the mica in place so that the retaining rings may be easily applied without catching on or interfering with the mica. The shrinkage of the rings forces the bars still more firmly into place within the grooves and makes an extremely rigid structure. After this operation is complete the bearing surface of the commutator may be turned down to a smooth finish and the mica undercut in accordance with standard practice for commutators of conventional construction.

In the particular machine chosen for illustration the shaft 1 and integral retaining ring 9 are formed of low expansion aluminum, such as 32ST. This material has a coefficient of expansion of 0.0000117. The copper commutator bars have a coefficient of expansion of 0.0000100. The retaining rings are of K-Monel, having a coefficient of expansion of 0.0000089. K-Monel also has a high tensile strength and high elastic limit. The heat is generated primarily at the commutator surface; owing to the internal cooling of the shaft the temperature gradient is downward through the copper bars and inward through the mica and the support ring. The temperature rise of the support ring being normally lower than that of the bars, the differential expansion as between the two metals is not as great as their different coefficients of expansion would indicate and the device is therefore thermally stable; tests through repeated thermal cycles have indicated no sign of working as between the parts. Stainless steel, with a coefficient of expansion of 0.0000110, which is substantially the mean of the coefficients of the copper and aluminum has also been used successfully in practice for the retaining rings, but K-Monel has a higher tensile strength and I prefer its use.

One of the most important features of the invention is the fact that the area through which heat is transferred from the commutator bars themselves to the supporting structure is very large, being a greater portion of the area of the sides of the bars instead of merely their tips, and because of the method of construction the mica insulation may be very thin natural mica instead of either built up or natural mica plate of perhaps 1/64" thick. The combination of large area and thin material is conducive to rapid heat transfer. This is a valuable asset, as preventing undue differential expansion between bars, even in cases where no internal cooling is provided. In combination with a hollow shaft it makes possible a commutator of very moderate dimensions in situations where commutators of conventional type would be unduly large and bulky.

While many details of construction have been set forth above, these details, like the dimensions given are for the purpose of illustration and are not essential to the practice of the invention. I do not therefore wish to be limited to these details but desire to cover the invention as broadly as stated in the following claims.

I claim:

1. A commutator structure comprising a support ring provided with a plurality of uniform substantially contiguous V-shaped grooves in the periphery thereof, a wedge-shaped commutator bar fitted into each of said grooves, retaining rings surrounding each end of said commutator and sheet insulation interposed between said bars and said support and retaining rings.

2. The combination of a commutator in accordance with claim 1 with a hollow shaft whereon said support ring is mounted, said shaft forming a passage for a cooling fluid.

3. The combination in accordance with claim 2 wherein said support ring is integral with said hollow shaft.

4. A commutator in accordance with claim 1 wherein said support ring, commutator bars and retaining rings have successively lower coefficients of expansion.

5. A commutator in accordance with claim 1 wherein said support ring is formed of metal relatively high in the scale of thermal conductivities.

6. A commutator in accordance with claim 1 wherein said support ring is formed of aluminum.

RALPH M. HEINTZ.

REFERENCES CITED

The following references are of record in the file of this patent:

UNITED STATES PATENTS

| Number | Name | Date |
|---|---|---|
| 716,476 | Read | Dec. 23, 1902 |
| 2,486,875 | Pollock | Nov. 1, 1949 |

FOREIGN PATENTS

| Number | Country | Date |
|---|---|---|
| 229,753 | Germany | Jan. 9, 1911 |